United States Patent [19]
Sato et al.

[11] 4,448,077

[45] May 15, 1984

[54] VIBRATION DIAGNOSIS METHOD FOR ROTARY MACHINE

[75] Inventors: Kazuo Sato, Kitaibaraki; Motoji Ohmori, Hitachi; Masakazu Takasumi, Ibaraki; Motohiro Shiga, Hitachi; Koki Shiohata, Ibaraki; Fumio Fujisawa, Mito, all of Japan

[73] Assignee: Hitachi, Ltd., Tokyo, Japan

[21] Appl. No.: 371,561

[22] Filed: Apr. 26, 1982

[30] Foreign Application Priority Data

Apr. 30, 1981 [JP] Japan .................................. 56-64162

[51] Int. Cl.³ ............................................. G01M 1/22
[52] U.S. Cl. ....................................... 73/660; 340/683
[58] Field of Search ................... 73/660; 340/682, 683; 364/508

[56] References Cited

U.S. PATENT DOCUMENTS 3,686,956  8/1972  Simpkin et al. ........................ 73/660
4,213,346  7/1980  Polovnikov et al. ................. 73/660
4,352,293 10/1982  Kurihara et al. ...................... 73/660

OTHER PUBLICATIONS

"Early Diagnosis of Dynamic Unbalances and of Misalignments in Large Turbogenerators", Clapis et al., *Eneria Nucleare*, vol. 23, No. 5, pp. 271-277.

*Primary Examiner*—Howard A. Birmiel
*Attorney, Agent, or Firm*—Antonelli, Terry & Wands

[57] ABSTRACT

A vibration diagnosis method for a rotary machine is disclosed. The presence or absence of a self-excited vibration is determined by checking if a rotating speed is in a rotating speed range which allows the occurrence of the self-excited vibration, if an amplitude of a frequency component corresponding to a first order critical speed is larger than a predetermined level, and if phases at characteristic points of vibration signals change among cycles.

11 Claims, 19 Drawing Figures

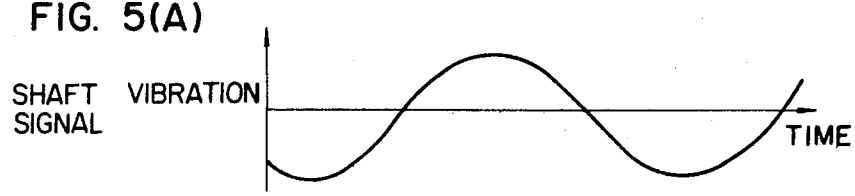
FIG. 5(A)
SHAFT VIBRATION SIGNAL
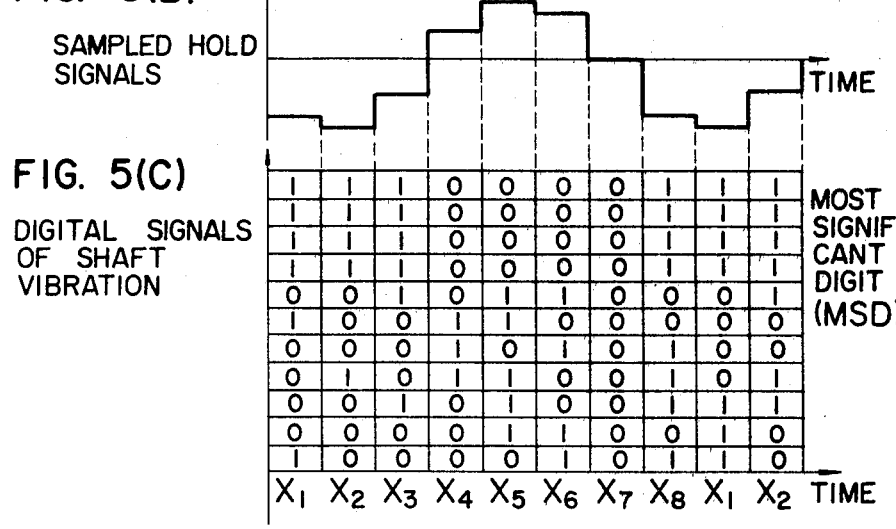
FIG. 5(B)
SAMPLED HOLD SIGNALS
FIG. 5(C)
DIGITAL SIGNALS OF SHAFT VIBRATION

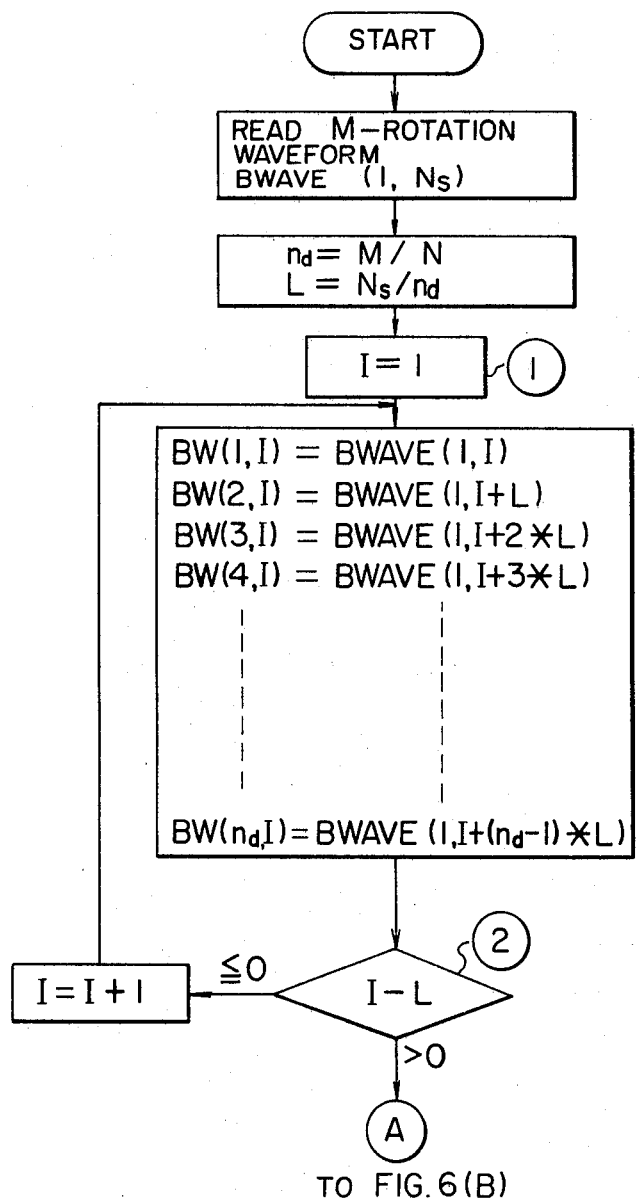

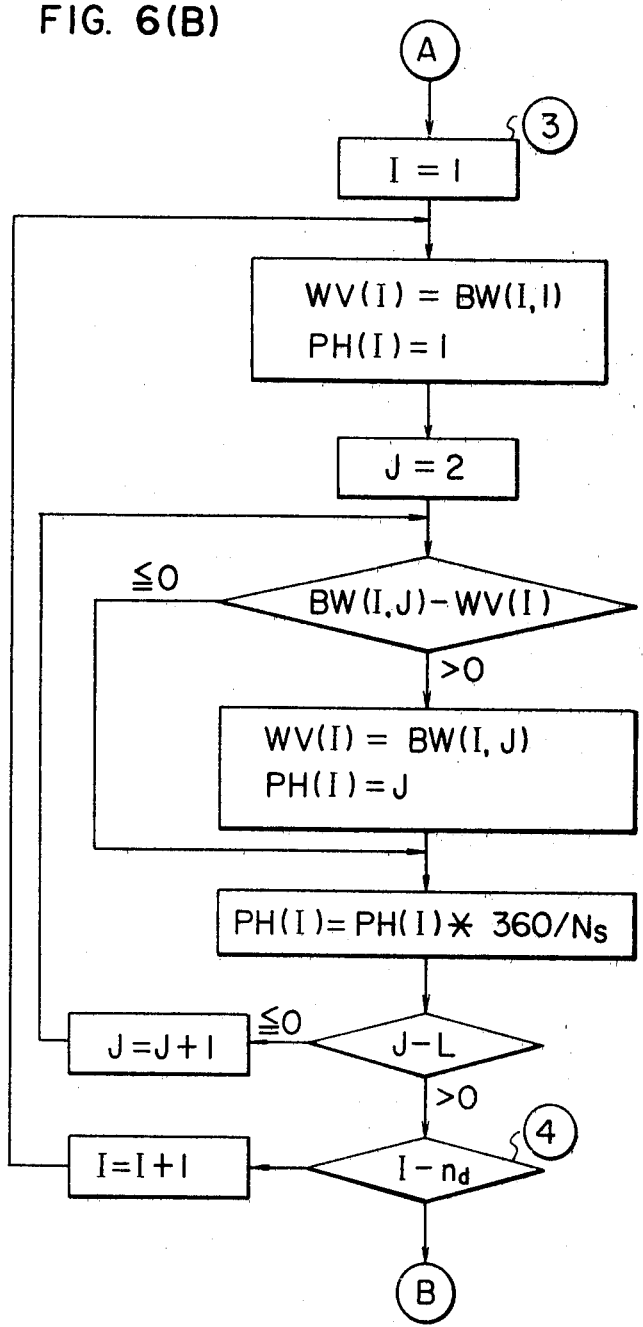

15 CYCLES — ONE SIGNAL PER ROTATION

TO FIG. 6(C)

NON-LINEAR VIBRATION

SELF-EXCITED VIBRATION

VIBRATION DIAGNOSIS METHOD FOR ROTARY MACHINE

The present invention relates to diagnosis of an abnormal running condition of a rotary machine, and more particularly to a vibration diagnosis method for a rotary machine in which a shaft vibration is watched and checked if it is a self-excited vibration or a non-linear vibration to diagnose a running condition of the rotary machine.

Generally, the capacity of a steam turbine and generator is being increased and it is an important task to prevent an accident of such a machine. The inventors of the present application noticed that an abnormal running condition of a rotary machine causes a shaft vibration and invented a method for diagnosing the running condition of the rotary machine by detecting self-excited vibrations due to an oil whip of a shaft by an oil film force, a hysteresis whirl (or friction whirl) by a dry friction based on a measured shaft vibration signal.

Of the self-excited vibrations, the oil whip frequently occurs in a rotor of a large size generator or a turbine and it is characterized by that a vibration amplitude increases self-excitedly and abruptly. It is one of the most detrimental vibration phenomena and hence it should be detected as early as possible so as to enable control of the operation of the rotary machine in order to prevent an accident.

The present invention relates to a safe operation of the rotary machine by detecting the self-excited vibration of the rotary machine at an early stage so as to diagnose the running condition of the rotary machine.

It has been known that the self-excited vibration occurs at a rotating speed which is more than two times as high as a first order critical speed which is determined by a natural frequency of a rotary body and the vibration frequency thereof is equal to a vibration frequency corresponding to the first order critical speed.

Among others, the oil whip is a phenomenon in which a shaft whips violently in the same direction as the direction of the rotation of the shaft by an oil film force in a well lubricated bearing when a rotor rotates at a rotating speed which is more than two times as high as the first order critical speed. The whipping frequency is lower than one half of a shaft rotating frequency.

The oil whipping frequency does not depend on the rotor rotating speed and is substantially equal to the rotating frequency at the first order critical speed. It has also been known that a point at which the oil whip appears when the rotating speed is increased differs from a point at which the oil whip disappears when the rotating speed is decreased and the latter is at a lower rotating speed than the former.

Since the self-excited vibration as represented by the oil whip does not depend on the rotating speed of the rotor, it can be detected by changing the rotating speed of the rotor and determining that the oil whip has not yet appeared if the vibration frequency changes with the rotating speed of the rotor and determining that the oil whip has appeared if the vibration frequency is constant in spite of the change of the rotating speed of the rotor. This method, however, is not advantageous in controlling the operation of the rotary machine because the rotating speed of the rotor must be increased in spite of the occurrence of the oil whip.

It has been proposed to observe a vibration waveform by a synchroscope and diagnose the occurrence of the oil whip by a change in the waveform. This method is not appropriate for automatic diagnosis because the decision must rely on an expert of vibration measurement.

An early diagnosis of dynamic unbalances and of misalignments of the rotary machine is disclosed in an article "Early Diagnosis of Dynamic Unbalances and of Misalignments in Large Turbogenerators" by A Clapis et al, Eneria Nucleare, Vol. 23, No. 5, Maggio 1976, pages 271–277. However, it does not refer to the detection of the oil whip.

It is a primary object of the present invention to discriminate a self-excited vibration occurred in a rotary machine under operation from other vibrations.

It is another object of the present invention to determine the presence or absence of the self-excited vibration during the operation of the rotor at a constant rotating speed without changing the rotating speed.

In order to achieve the above objects, it is a feature of the present invention to make use of the fact that the self-excited vibration occurs when the rotating speed of the rotor is more than two times as high as the first order critical speed in order to detect the presence or absence of the self-excited vibration without changing the rotating speed of the rotor.

It is another feature of the present invention to detect a phase difference between a predetermined reference point and a phase detecting point for each of a plurality of successive vibration waveforms and determine the occurrence of the self-excited vibration when the detected phase differences are not uniform.

The present invention will be apparent from the following detailed description taken in conjunction with the accompanying drawings, in which.

Figure 6C:
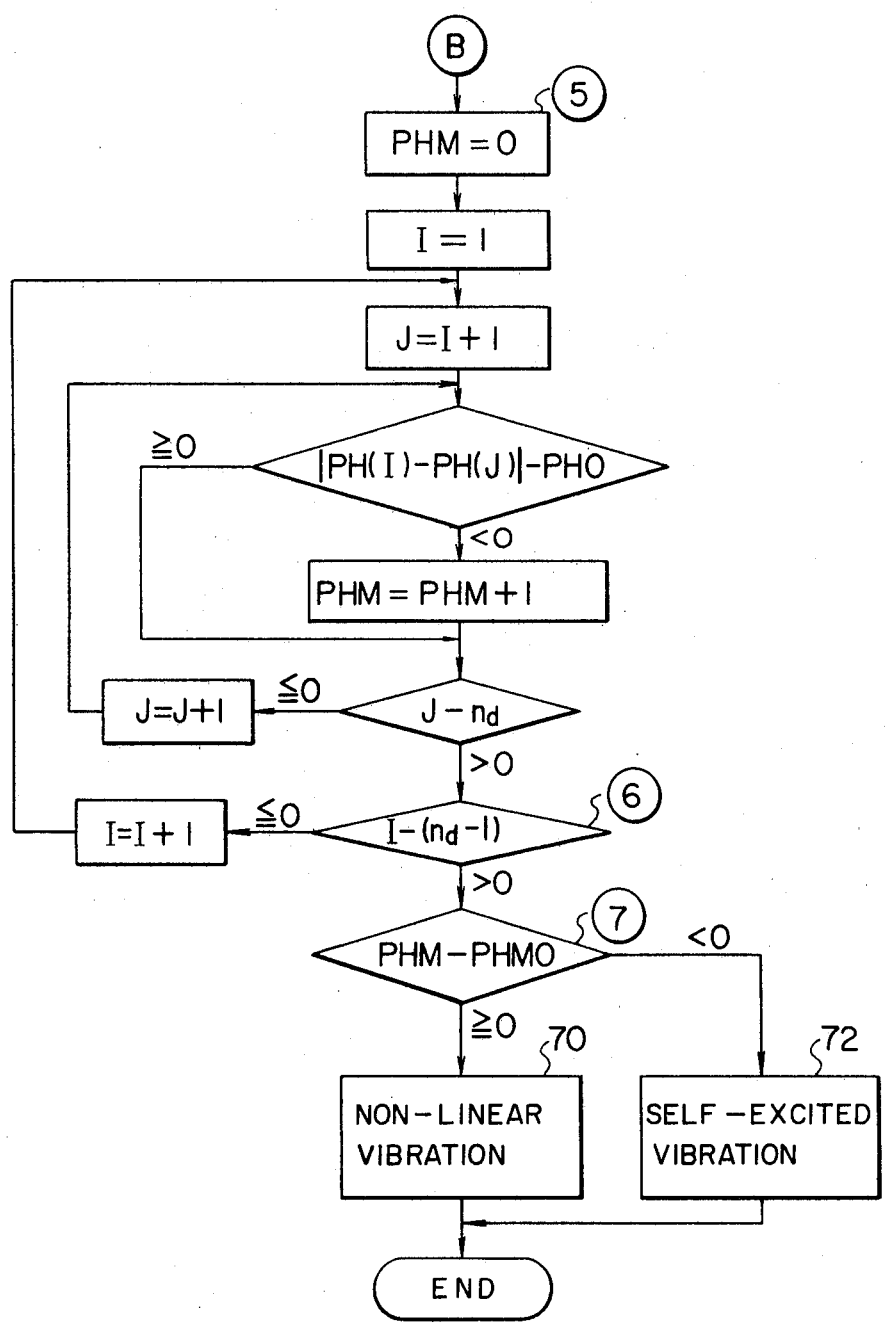
Figure 7A:
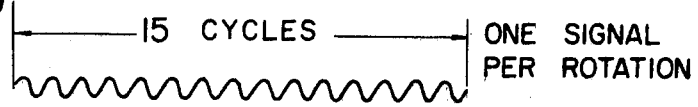
Figure 7B:
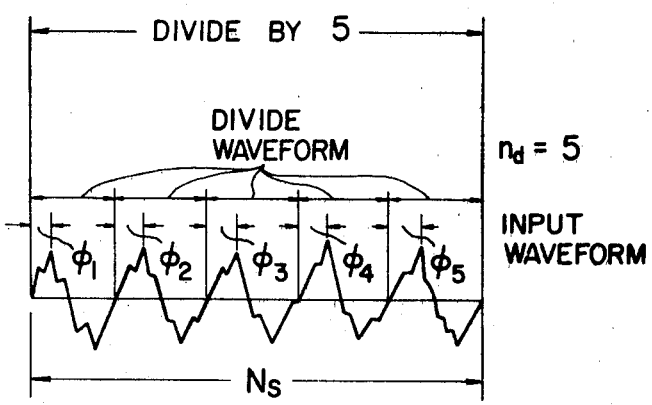
Figure 8:
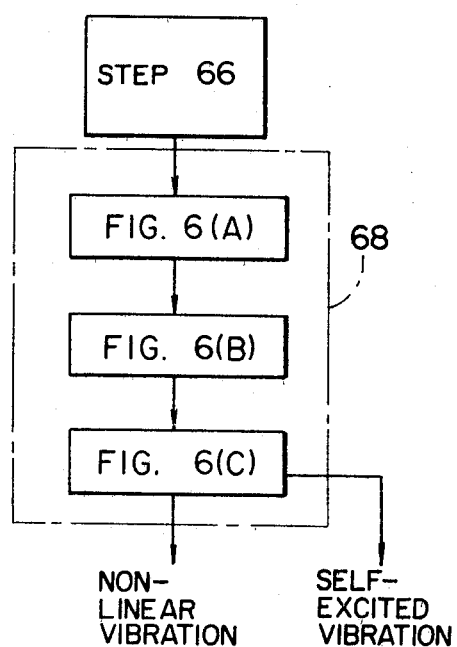
Figure 10:
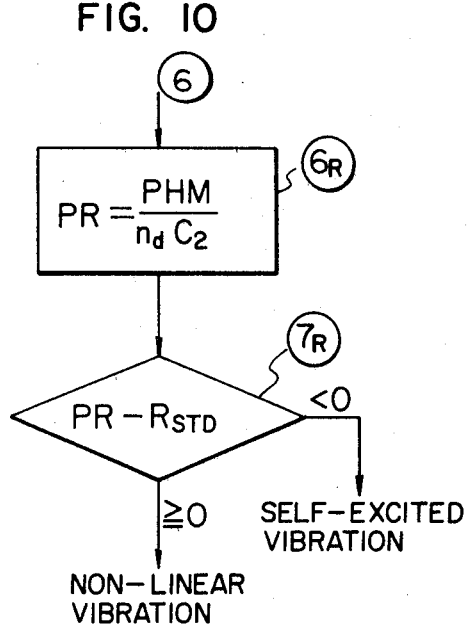
Figure 11A:
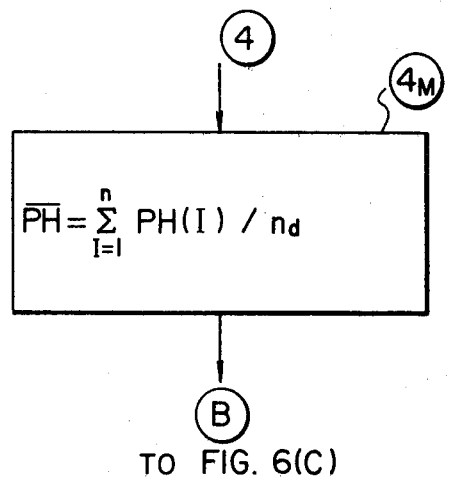
Figure 11B:
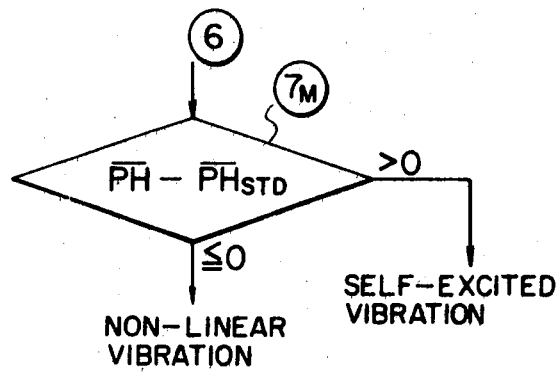
Figure 12:
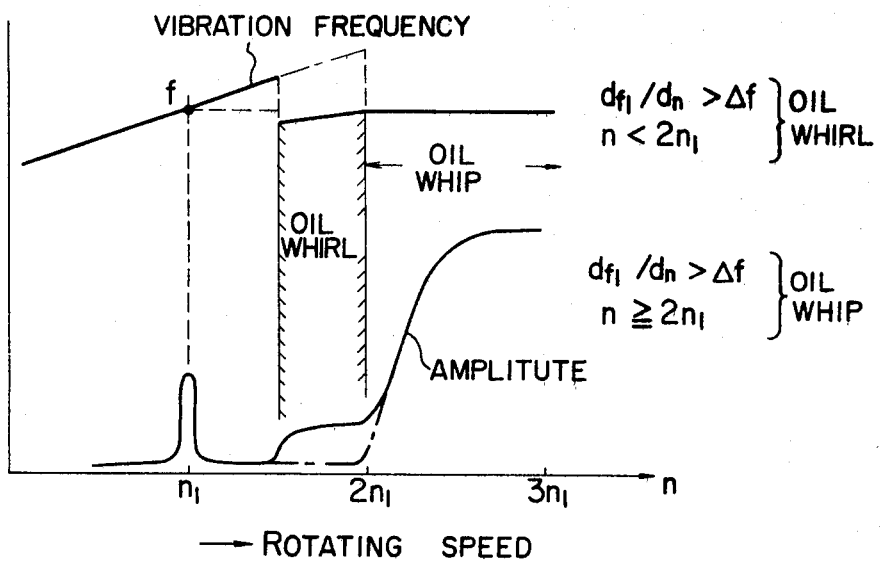

FIGS. 5(A)–5(C) show sample data for a sinusoidal wave;

FIGS. 6(A)–6(C) show flow charts for determining change in whipping phase;

FIGS. 7(A) and 7(B) show waveforms when $M=15$, $N=3$ and $n_d=5$;

FIG. 8 shows a relationship between the steps of FIGS. 6(A)–6(C) and other steps;

FIGS. 9(A), 9(B), 10, 11(A) and 11(B) show other embodiments of the present invention; and FIG. 12 illustrates the oil whirl and the oil whip.

Figure 1:
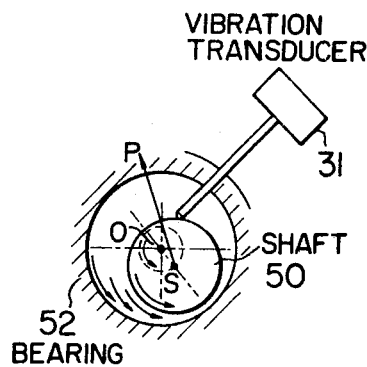
FIG. 1 illustrates an oil whip phenomenon.

A preferred embodiment of the present invention is now explained. First, the self-excited vibration occurring near a rotor rotating speed which is two times as high as the first order critical speed is explained. FIG. 1 illustrates the occurrence of the self-excited vibration by an oil film force, that is, the oil whip (which may sometimes be referred to as an oil film whirl).

Let us assume that a rotary shaft 50 rotates in a well lubricated bearing 52. In a normal condition, the shaft 50 rotates stably with a center of the shaft being at a center of the bearing 52. By some external disturbance such as a pressure distribution of an oil film in a gap of the bearing, a restoring force p acts as shown in FIG. 1. It does not coincide with the direction of displacement of the shaft. The rotary shaft whips in the same direction as the rotation of the shaft by a component of the force which is normal to a line OS. This unstable whip occurs when the rotating speed of the shaft is more than two times as high as the first order critical speed $n_1$ (a rotating speed corresponding to a first order natural frequency $f_1$). This is called the oil whip which is one of the obstacles to be overcome in a high speed rotary shaft.

Figure 2:
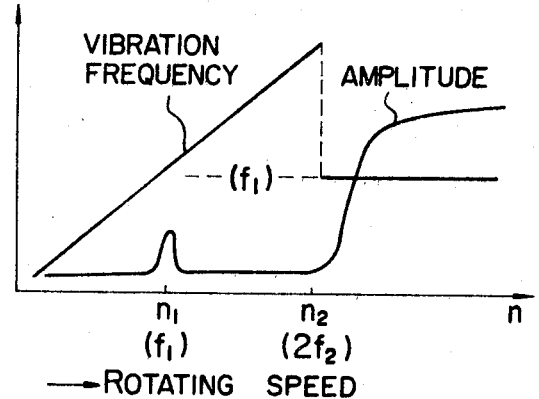
FIG. 2 shows a vibration amplitude and a vibration frequency of the oil whip.

FIG. 2 shows a vibration characteristic measured by a transducer 31 for a rotating speed. It shows that the vibration amplitude increases abnormally near the rotating speed of $n_2$ ($\approx 2n_1$, $2f_1$) and the vibration frequency is substantially equal to $f_1$. Once the oil whip occurs, the vibration amplitude increases. Accordingly, it must be detected at an early stage to take appropriate measure. The present invention makes use of the characteristic of the self-excited vibration as represented by the oil whip shown in FIG. 2 to detect the self-excited vibration at the early stage. An embodiment for the oil whip is now explained.

Figure 3:
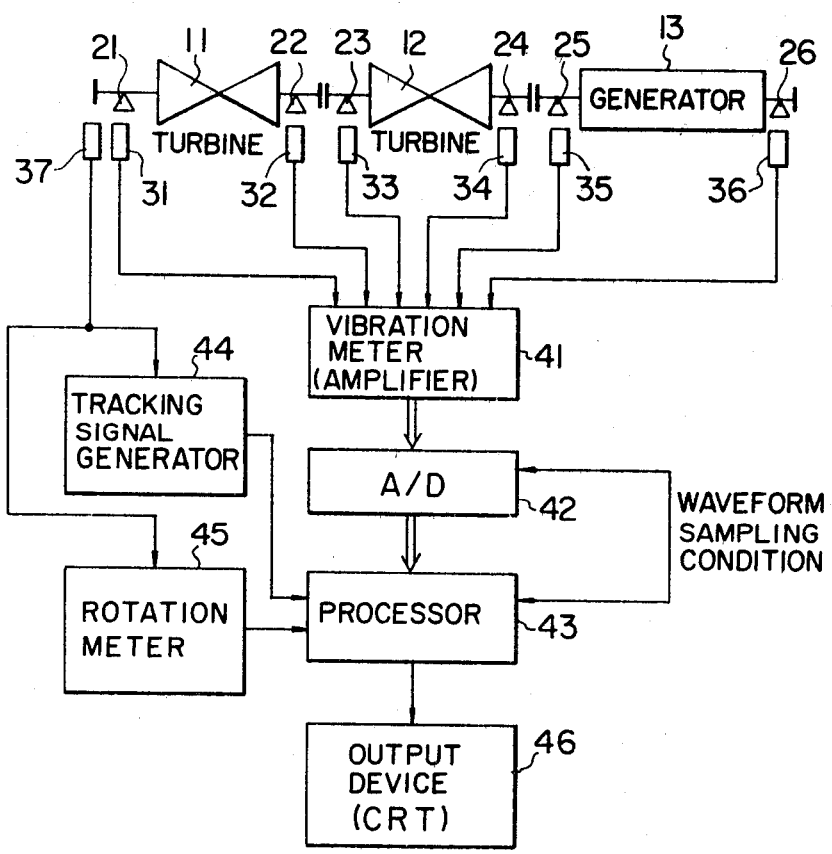
FIG. 3 shows an overall configuration of the present invention.

FIG. 3 shows an overall configuration a pair of turbine rotors 11 and 12 for a steam turbine or a gas turbine and a generator rotor 13 which is directly connected tk the rotors 11 and 12 and driven thereby are supported by bearings 21, 22, 23, 24, 25 and 26. Vibration transducers 31, 32, 33, 34, 35 and 36 are mounted on the bearings 21-26, respectively, to transduce vibrations of the bearings to electrical signals. A pulse detector 37 for detecting a rotating speed of a shaft is mounted on the bearing and produces a pulse signal (one pulse per rotation) corresponding to the rotating speed of the shaft. The outputs of the vibration transducers 31-36 are supplied to a vibration meter 41 which amplifies the outputs and supplies the amplified signals to an A/D (analog-to-digital) converter 42. Digital signals from the A/D converter 42 are supplied to a data processor 43.

On the other hand, the output of the pulse detector 37 is supplied to a tracking signal generator 44 and a rotation meter 45. The tracking signal generator 44 converts the pulse signal to a signal necessary to analyze a rotation order ratio and supplies the converted signal to the data processor 43. The rotation meter 45 converts the output of the pulse detector 37 to a digital signal representative of the rotating speed and supplies the digital signal to the data processor 43. The data processor 43 may be a computer which analyzes the frequency component of the supplied vibration waveforms by a fast Fourier transform (FFT) and processes the resulting data.

Waveform sampling conditions such as the number of vibration waveforms to be sampled, a precision and sample values are set and the waveforms are sampled in accordance with the preset conditions.

Figure 4:
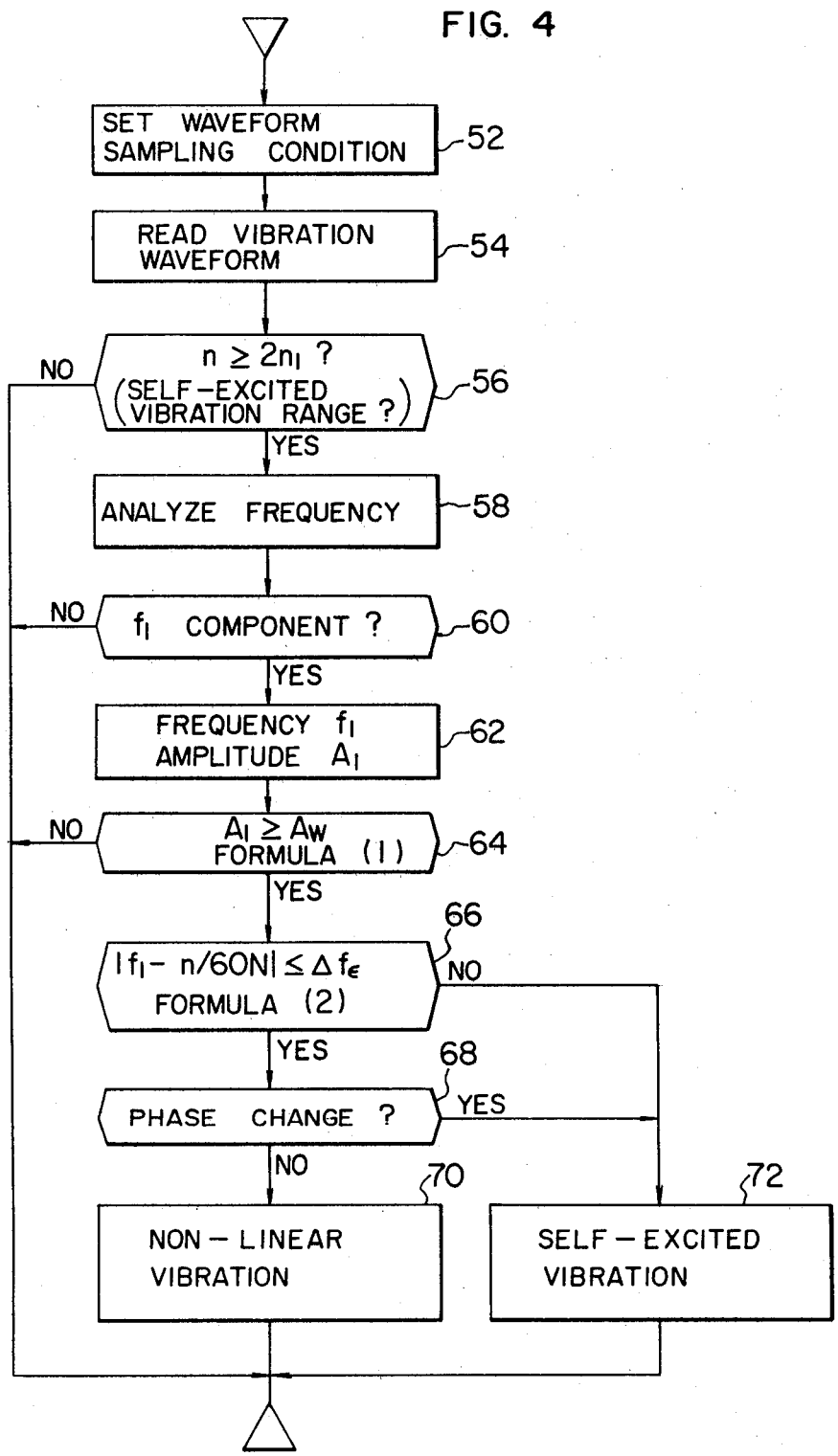
FIG. 4 shows a process flow chart.

FIG. 4 shows a process flow of the processor 43. In a step 52, the sampling conditions for the waveform are set, and digital values of the waveform are samples in accordance with the preset conditions in a step 54. FIGS. 5(A)-5(C) show examples where the vibration waveform is a sinusoidal waveform and the number of samples in one period is eight. Signal as shown in FIG. 5(C) are supplied to the processor 43.

In a step 56, it is checked if the rotating speed n is larger than or equal to $n_2$ ($n \geq n_2(=2n_1)$?). If a self-excited vibration region is detected by the above check step, the presence or absence of a component $f_1$ is checked in a step 60. If the component $f_1$ is present, an amplitude $A_1$ of the component $f_1$ is determined in a step 62. If the amplitude $A_1$ is smaller than a predetermined amplitude $A_w$, it is decided that the component $f_1$ is present but the determination of the self-excited vibration is not necessary (step 64). This decision is made in accordance with $$A_1 \geq A_w \quad (1)$$

In a step 66, it is determined if $f_1$ is equal to 1/N order subharmonic non-linear vibration frequencies ($\frac{1}{2}$, $\frac{1}{3}$, ...). It is determined in accordance with $$|f_1 - n/60N| \leq \Delta f_\epsilon \quad (2)$$

n: revolution per minutes (rpm)
and if a frequency deviation is equal to $\Delta f_\epsilon$ (a vibration frequency difference discrimination reference) it is decided that it is difficult to determine if the self-excited vibration has occurred or not. If the formula (2) is not met, it is decided that the self-excited vibration such as the oil whip has occurred.

If the formula (2) is met, it is possible that a non-linear vibration rather than the self-excited vibration has occurred. Next, it is checked if a phase of whirling changes or not to determine whether the vibration under consideration is the non-linear vibration or the self-excited vibration.

The presence or absence of the change of the phase of the whip, that is, the determination if the whip is in constant synchronism with the rotation is a key point to determine the non-linear vibration or the self-excited vibration. FIGS. 6(A)-6(C) show flow charts for determining the presence or absence of the change of the phase of the whip. FIGS. 7(A) and 7(B) show relationship with the sampled waveform.

In a step 68 of FIG. 4, the sampled waveform is processed in a following manner. The input signal corresponds to the amplitude of the waveform as shown in FIG. 5(C) and $\phi_1-\phi_5$ (for $n_d=5$) as shown in FIG. 7(B) are determined. Reference is made to FIGS. 6(A)-6(C).

In FIG. 6(A), $N_S$ represents a total number of sampling points and it is usually equal to a power of two such as $2^8 = 256$ in order to facilitate the processing in the digital processor, $n_d$ represents the number of waves and it is equal to 5 in the example shown in FIG. 7(B), N represents an order (N in 1/N order subharmonic non-linear vibration) and it is equal to 3 in the example shown in FIG. 7(B). Accordingly, M=15 (FIG. 7(A)) and M is varied such that $n_d$ assumes an integer. L represents the number of sampling points per wave. In the steps ①-②, data are arranged for each wave.

In FIG. 6(B), a phase PH (I) of a maximum value data for each wave is determined based on the data arranged in FIG. 6(A). In the PH (I), $\phi_1-\phi_5$ of FIG. 7(B) are determined (I=5).

In FIG. 6(C), mutual phase differences are determined in steps ⑤-⑥. In the example shown in FIG. 7(B), ten mutual phase differences ($_5C_2$, $n_d=5$)

$\phi_1-\phi_2$, $\phi_2-\phi_3$, $\phi_3-\phi_4$, $\phi_4-\phi_5$, $\phi_1-\phi_3$, $\phi_2-\phi_4$, $\phi_3-\phi_5$, $\phi_1-\phi_4$, $\phi_2-\phi_5$, $\phi_1-\phi_5$ are calculated. PHO represents a discrimination reference for the mutual phase differences. PHM in FIG. 6(C) represents the number of data having the mutual phase differences which are smaller than the reference PHO=$\theta_0$. In the steps ⑤-⑥, all of the phase difference data are compared with the reference.

In a step ⑦ of FIG. 6(C), the non-linear vibration or the self-excited vibration is determined. PHMO (=$m_o$) represents a reference for the number of data PHM. Thus, PHM represents a degree of in-phase. Accordingly, if PHM≧PHMO, it is decided that the non-linear vibration has occurred, and if PHM<PHMO it is decided that the self-excited vibration has occurred. The result of the decision is supplied to alarm means in steps 70 and 72 of FIG. 4.

FIGS. 6(A)-6(C) correspond to the processing of the step 68 shown in FIG. 4 and a relation therebetween is shown in FIG. 8.

In the embodiment shown in FIGS. 6(A)-6(C), the determination is made based on the number of data of $n_d$ waves having smaller mutual phase difference at the maximum amplitude than the reference value $\theta_0$. Alternatively, the determination may be made based on an average phase difference. A flow chart therefor is shown in FIGS. 9(A) and 9(B).

Figure 9A:
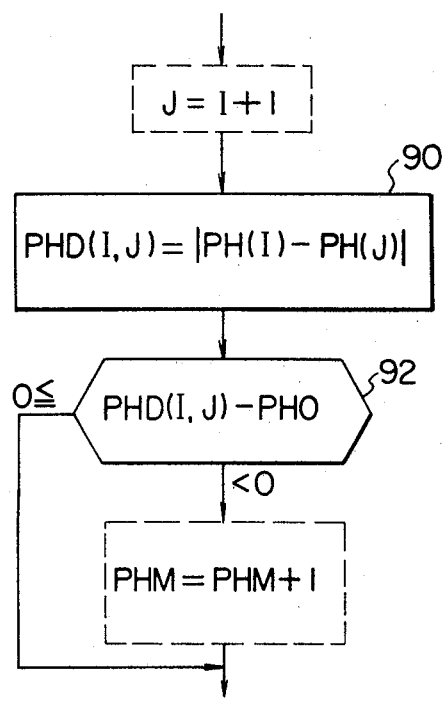
Figure 9B:
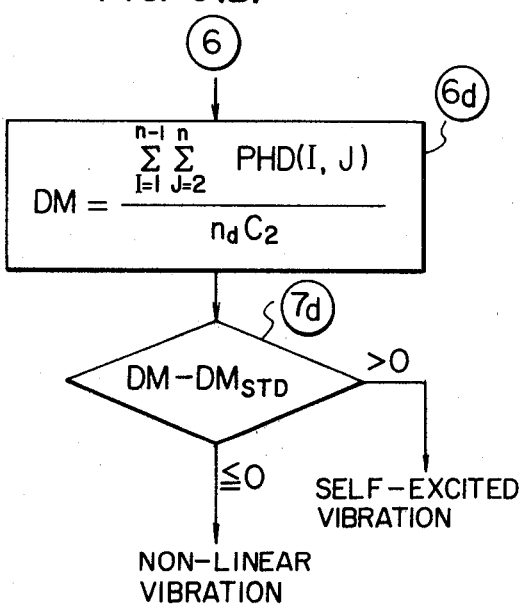

In FIG. 9(A), PHD (I, J) represents an absolute value of a phase difference between PH (I) and PH (J). Ten data for the $_5C_2$ cases (FIG. 7(B)) are determined. In FIG. 9(B), a sum of the data is divided by $n_dC_2$ so that an average value DM of the phase difference is calculated (step ⑥d in FIG. 9(B)). In a step ⑦d which corresponds to the step ⑦ of FIG. 6(C), a difference between the average phase difference DM and a reference phase difference $DM_{STD}$ is calculated. If DM is larger than $DM_{STD}$, it is determined that the self-excited vibration has occurred, and if DM is smaller than $DM_{STD}$, it is determined that the non-linear vibration has occurred. In FIGS. 9(A) and 9(B), the determination is made based on the average phase difference. Because the phase differences are averaged, a phase difference due to an affect by a short duration noise can be fully compensated.

Alternatively, the determination may be made based on a ratio PR of PHM (the number of data having smaller phase differences than the reference value) to the total number $n_dC_2$ of data. FIG. 10 shows a flow chart therefor. In a step ⑥R, the ratio PR of PHM to $n_dC_2$ is calculated. This is a ratio to the total number of combination of wave $n_d$ ($n_d$=5 in FIG. 7(B)). This method does not require the calculation of the absolute value of PHMO as is required in the method of FIG. 6(C) but a relative ratio $R_{STD}$ is to be set. (Accordingly, the frequency of updating the setting is lower.)

Alternatively, the determination may be made based on an average value of the phases of the waves, that is, $\phi_1=\phi_5$ of FIG. 7(B). FIGS. 11(A) and 11(B) show flow charts therefor. In a step ④M of FIG. 11(A), an average value of $\phi_1$-$\phi_{nd}$ in FIG. 7(B) is calculated. In FIG. 11(B), the average phase $\overline{PH}$ is compared with a reference phase $\overline{PH}_{STD}$, and if $\overline{PH}$ is larger than $\overline{PH}_{STD}$ it is determined that the self-excited vibration has occurred and if $\overline{PH}$ is smaller than $\overline{PH}_{STD}$, it is determined that the non-linear vibration has occurred.

In the present invention, the self-excited vibration is detected by the phase change at the early stage during the constant speed operation to diagnose the operating condition.

The oil whirling also occurs in connection with the oil whipping. This is illustrated in FIG. 12. A chain line shows a characteristic when only the oil whip is present and a solid line shows a characteristic when the oil whirl has occurred and then the oil whip has occurred.

In any case, $df_1/dn$ exceeds a predetermined value $\Delta f$. For the oil whip, it exceeds in a region of $n≧2n_1$, and for the oil whirl it exceeds in a region of $n_1≦n≦2n_1$. Thus, the oil whip and the oil whirl can be discriminated by the region of the rotating speed. The presence or absence of the oil whirl can also be determined by the phase change in a manner described above. For the oil whirl, the vibration frequency is not independent of n but it slightly changes with n. Accordingly, a reference value must be appropriately set.

In the embodiments described above, the phases at the maximum amplitudes of the waves, that is, $\phi_1$-$\phi_{nd}$ in FIG. 7(B) are considered. Alternatively, a second peak value may be considered or a phase $\phi_{nd}$ at a characteristic point may be considered.

The frequency analysis in the step 58 of FIG. 4 may be effected by the FHT method shown in the U.S. Pat. No. 4,302,813 assigned to the assignee of the present application.

The friction whirl of the self-excited vibration may be detected by using two vibration transducers to detect the direction of the whirl. The friction whirl is determined when the direction of the whirl is opposite to the direction of the rotation.

What is claimed is:

1. A vibration diagnosis method for a rotary machine which detects a shaft vibration of the rotary machine to diagnose the presence or absence of a self-excited vibration on the basis of a detected shaft vibration signal comprising:

a first step of detecting a rotating speed n of the rotary machine;

a second step of determining if the rotating speed n detected in the first step is not lower than two times of a rotating speed $n_1$ corresponding to a first order natural frequency of the rotary machine;

a third step of determining phases at predetermined characteristic points on a vibration waveform of the detected shaft vibration signal in a plurality of cycles of the detected shaft vibration signal when it is determined that the detected rotating speed n is not lower than the rotating speed $n_1$;

a fourth step of determining a difference between the determined phases for at least adjacent ones of the plurality of cycles; and a fifth step of diagnosing the occurrence of the self-excited vibration on the basis of the phase difference determined in the fourth step.

2. A vibration diagnosis method according to claim 1, wherein in the third step phases at maximum amplitudes in the plurality of cycles of the vibration signal are determined and in the fifth step the occurrence of the self-excited vibration at the rotating speed n is diagnosed when the phases change.

3. A vibration diagnosis method according to claim 2, wherein the occurrence of the self-excited vibration is diagnosed when the number of vibration waves having larger mutual phase differences than a predetermined phase angle is larger than a predetermined number in the plurality of cycles.

4. A vibration diagnosis method according to claim 3, wherein the occurrence of the self-excited vibration at said operating speed is diagnosed when a ratio of the number of vibration waves having larger mutual phase differences than the predetermined phase angle to a total number of input vibration waves is larger than a predetermined number.

5. A vibration diagnosis method according to claim 1, wherein in the fifth step the occurrence of the self-excited vibration is diagnosed when there is a mutual phase difference between a phase in one cycle of the vibration signal and the phases in other cycles of the vibration signal.

6. A vibration diagnosis method according to claim 1, wherein the third step comprises detecting a first order natural frequency component of the rotary machine for the vibration signal, and determining the phases when the first order natural frequency component is larger than a predetermined amplitude and the rotating speed n is in a predetermined rotating speed range which permits the occurrence of the self-excited vibration.

7. A vibration diagnosis method according to claim 1, wherein the number of the plurality of cycles is determined such that the number of samples in the plurality of cycles is an integer and data at a sampling period determined by the number of samples for the determined number of cycles are processed.

8. A vibration diagnosis method according to claim 1, wherein the third step comprises establishing as the number of sampling points for the vibration waveform of the vibration signal in the plurality of cycles a value equal to a power of two, sampling the vibration waveform at a sampling period determined by the established number of sampling points, and determining the phases at the characteristic points based on the sampling period.

9. A vibration diagnosis method according to claim 1, wherein in the fifth step the occurrence of the self-excited vibration is diagnosed when an average value of the phase differences in the plurality of cycles of the vibration signal exceeds a predetermined value.

10. A vibration diagnosis method according to claim 1, wherein the rotary machine has the shaft thereof supported in at least one bearing, and the fifth step in diagnosing includes determining at least one of an oil whirl, an oil whip, and a frictional whirl.

11. A vibration diagnosis method according to claim 1, wherein the rotary machine has the shaft thereof supported in at least one oil lubricated bearing, and the fifth step of diagnosing includes determining at least one an oil whirl and an oil whip.

* * * * *